United States Patent
Zhu et al.

(10) Patent No.: US 6,833,185 B2
(45) Date of Patent: Dec. 21, 2004

(54) FLUIDIZATION ADDITIVES TO FINE POWDERS

(75) Inventors: Jesse Zhu, London (CA); Hui Zhang, London (CA)

(73) Assignee: The University of Western Ontario, London (CA)

(*) Notice: Subject to any disclaimer, the term of this patent is extended or adjusted under 35 U.S.C. 154(b) by 0 days.

(21) Appl. No.: 10/193,687

(22) Filed: Jul. 12, 2002

(65) Prior Publication Data

US 2004/0009340 A1 Jan. 15, 2004

(51) Int. Cl.$^7$ ............................. B32B 5/16; A61K 9/14
(52) U.S. Cl. ................. 428/323; 428/328; 428/330; 428/402; 424/400; 424/489
(58) Field of Search .................. 428/402, 323, 428/328, 330; 424/400, 489

(56) References Cited

U.S. PATENT DOCUMENTS

| | | | |
|---|---|---|---|
| 5,171,613 A | 12/1992 | Bok et al. | 427/422 |
| 5,470,893 A | 11/1995 | Sinclair-Day et al. | 523/205 |
| 5,635,548 A * | 6/1997 | Kittle et al. | 523/220 |
| 5,955,530 A | 9/1999 | Inoue et al. | 524/493 |

FOREIGN PATENT DOCUMENTS

WO 9936481 7/1999

OTHER PUBLICATIONS

The Effect of Particle Size and Size Distribution on the Behaviour of Gas–Fluidised Beds, D. Geldart; Powder Technology– 6 (1972) pps. 201–215.

Types of Gas Fluidization, D. Geldart; Powder Technology (1972) pps. 285–292.

An Invited Review Van der Waals and Other Cohesive Forces Affecting Powder Fluidization; J. Visser, Powder Technology 58 (1989) pps. 1–10.

* cited by examiner

Primary Examiner—Monique R. Jackson
(74) Attorney, Agent, or Firm—Lynn C. Schumacher; Hill & Schumacher (57) ABSTRACT

The present invention provides powder fluidization additives for increasing flowability of fine powders. The powder fluidization additives have both a smaller size than the fine powder and a mean apparent particle density less than the mean apparent particle density of the fine powder. The particles of the additive act to separate the fine powder particles and reduce interparticle forces allowing the flowability of the fine powder to be increased.

52 Claims, 3 Drawing Sheets

FLUIDIZATION ADDITIVES TO FINE POWDERS

FIELD OF THE INVENTION

The present invention relates to fluidization additives to fine powders, and more particularly the present invention relates to fluidization additives to fine paint powders.

BACKGROUND OF THE INVENTION

Fluidization occurs when particulate materials having sizes ranging from sub-micrometers to several millimeters are suspended by up-flowing gas in a vessel or column which results in a gas-solid suspension, more commonly referred to as a fluidized bed. The fluidized beds formed with the gas-solid suspension are specifically referred to as gas-solid fluidized beds. The term "fluidized bed" applies because the gas-solid suspension formed by the solid particles and the upflowing gas behaves like a fluid. A gas-solid fluidized bed can operate in several fluidization regimes: particulate, bubbling, slugging and turbulent fluidization regimes (collectively called conventional fluidized beds), and fast fluidization and pneumatic transport regimes (collectively called high-velocity fluidized beds). There is a minimum gas velocity, called minimum fluidization velocity, below which the bed is not fluidized.

Key characteristics of fluidized beds include easy handling of particles, excellent contact between gas and solids, excellent heat and mass transfer between gas and solids and between gas-solid suspensions and the column wall, and good mixing of gas and solids to mention a few. These and other useful characteristics have led to the wide application of fluidized beds in powder processing and related industries. The "easy handling of particles" in fluidized beds is due to the uniform solids suspension inside the bed and the relatively free movement of the particles within the gas-solids suspension and of the suspension itself.

Powders may be classified into four groups in gas-solid fluidized systems, according to Geldart's classifications (Geldart, "The Effect of Particle Size and Size Distribution on the Behavior of Gas Fluidized Beds", Powder Technology, Volume 6, 210, 1972 and Geldart, "Types of Gas Fluidization", Powder Technology, Volume 7, 285, 1973). Groups B and D powders comprise large particles that typically result in large bubbles when fluidized. Group A powders comprise particles that first experience a significant expansion of the powder bed when fluidized before bubbles begin to appear. Both Group B and Group A powders can be well fluidized. Group C powders comprise very small (fine) particles for which interparticle forces significantly affect the fluidization behaviour in such a way that fluidization of these powders is very difficult. Typically, as the particle size reduces, interparticle forces increase significantly causing the fine particles to agglomerate since they become very cohesive. Typical Group C powders comprise particles under 25–35 $\mu$m in average size, although powders larger than these sizes which are very cohesive may also belong to the Group C powders. Thus, due to strong interparticle forces, Group C powders are either very difficult to fluidize (with channeling and/or very poor fluidization) or they primarily fluidize with the large agglomerates as pseudo-particles rather than as individual particles. In either case, fluidization of individual particles cannot be achieved easily which makes handling of Group C powders problematic. Group C powders also tend to clog up in certain areas of the fluidized bed, powder transport lines and powder processing equipment, such as above the gas distributor and around internals and at exit port(s), and tend to stick to the internal wall, corners or the ceiling of the bed, transport lines and other powder processing equipment.

There are many processes or uses for which Group C fine powders need to be handled. To enhance their flowabilities, different measures have been taken to assist the fluidization and transportation of these Group C powders. Those methods are usually referred to as fluidization aids. Fluidization aids include mechanical stirring, acoustic, mechanical or ultrasonic vibration, addition of much larger particles to provide extra stirring, pulsation of fluidization gas, to mention just a few. Some of these measures are more effective than others for a given Group C powder, but the effectiveness of almost all of these measures tends to diminish as the powder becomes finer or smaller in size. As used herein, the terms "fluidization aids", "flow aids" and "transportation aids" are referring to the additional measures or methods applied to the fluidized bed and/or powder to enhance the fluidization and handlability of fine powders, while the terms "fluidizability", "flowability", "handlability" and "transportability" are referring to the same general concept, that is, the ability of a powder to flow better and therefore to be handled and transported more easily.

Another method of increasing fluidizability of powders involves the addition of some silica or alumina finer particles (additives). For example, it has been known that adding a small fraction of extremely fine silica powder improves the fluidization of Group C powder. On the other hand, addition of many other finer particles has been observed not to help in the fluidization of fine powders. Therefore, the mechanism is not yet clearly understood, although some have speculated a "lubricant" effect. As used herein, the terms "lubricant", "lubricating agent" and "additive" are all referring to solid additives that are added to the finer powder, aiming at enhancing its fluidization.

An example where it is extremely important to maintain good fluidization and transportation of fine powders is powder coating. Powder coating is a process superior to the traditional liquid coating process. A traditional paint application technique, referred to as "wet coating", involves the application of a liquid paint where solid paint components are first dissolved into or suspended in a solvent which is then applied to the surface of the part being painted. Polymerization and/or other reactions of the paint components then occurs in the wet paint layer on the surface, leading to the hardening of the paint coat while the solvent evaporates and is released to the atmosphere. Any over-sprayed paint and solvent are essentially wasted due to the non-recyclability. Since most of the liquid solvents are organic compounds, they cause serious environmental problems. Legislation and environmental concerns have led to the development of a new alternative coating procedure, which is called the "powder coating process".

In contrast to the traditional wet coating techniques, the powder coating process involves directly applying a powder paint onto the surface of the part being painted using a carrier gas where the powder is "held" by electrostatic forces. The parts are then put through a curing oven where the powder paint melts and hardens through a series of chemical reactions. Most of the over-sprayed powder paint is recycled. Therefore powder coating is an environmentally friendly technology because it eliminates any organic or inorganic solvents and makes it possible to reuse the over-sprayed paint.

Figure 1:
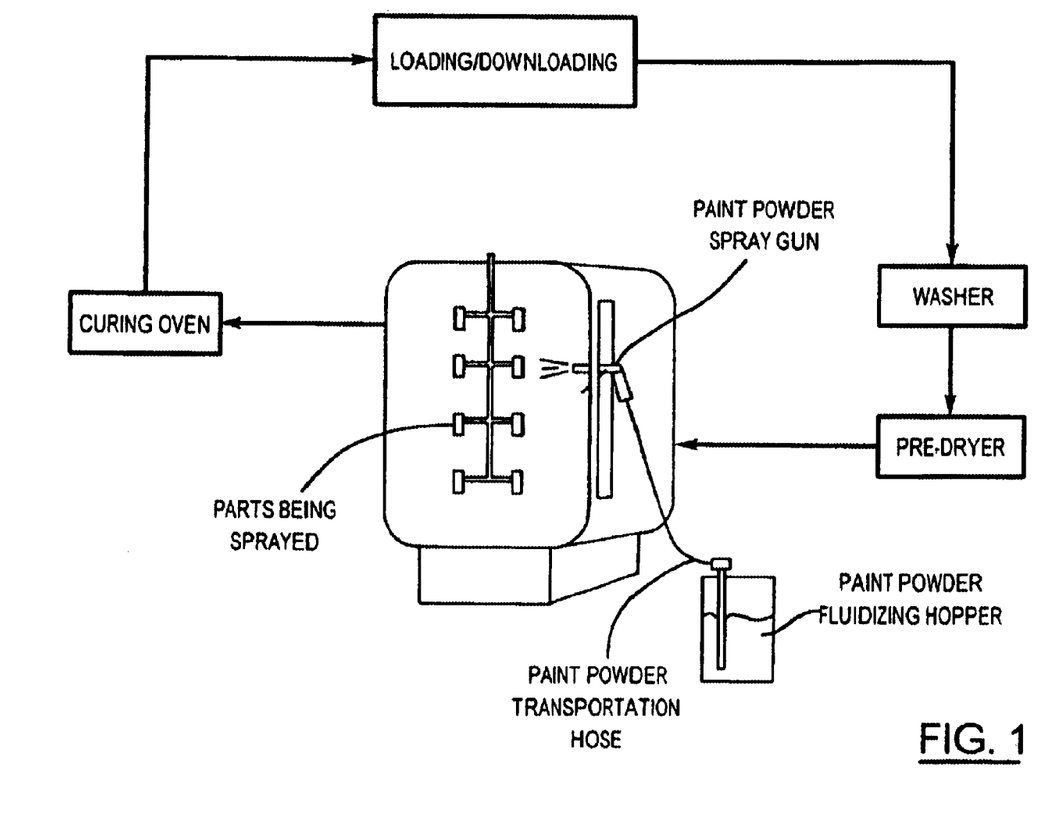
FIG. 1 is a block diagram of a powder coating production line.

More particularly, a typical powder coating production line consists of a washer, a pre-dryer, a paint booth, a curing oven and a loading/downloading section, as shown in FIG. 1. Parts loaded on the conveyer are first washed to remove dirt, soil and oil. The parts are then dried in a pre-dryer to remove the residual water after which they are ready for powder coating. A paint powder stored in a powder hopper is fluidized by a gas (normally air) and pneumatically transported to a spray gun (either a corona or tribo gun) where it is sprayed onto the surface of the part. Due to the fact that the powder is electrically charged before it reaches the part, the powder will be attracted to the surfaces of the parts that are electrically grounded. When the desired thickness of powder layer has been deposited, the parts are transferred to the curing oven where the paint is melted and hardened. This process has been widely used and it is known that only relatively coarse size powders (normally with average sizes larger than 30–35 microns) can be applied with the existing process and facilities.

Attempts to date to use finer powders have deleteriously resulted in non-smooth powder fluidization, uneven powder transportation and spray (e.g., powder puffing at the gun tip), non-uniform coating surface as well as other undesirable situations. The difficulties with fluidization and pneumatic transportation of fine powders are due to their poor flowability. Generally, when the average size of powder particles is smaller than 20–30 microns, the distances between particles become so small that van der Waals and other interaction forces between particles dominate and the powder becomes very cohesive. Large numbers of particles cling to each other resulting in the formation of agglomerates and/or clumps and cakes. As a result it becomes difficult to fluidize the powder when air passes through the powder bed (or powder-fluidizing hopper). For example, a non-uniform and/or non-stable fluidization, or channeling, will occur in the powder-fluidizing hopper. This leads to a non-stable powder supply (or in many cases, no viable powder supply) to the powder dispensing system such as a spray gun.

In addition, when fine powder is being transported from the powder hopper to the spray gun through the transportation hose, the fine powder tends to stick to and accumulates on the inside of the hose and gun, causing puffing and choking. At bends or other locations where the direction of powder flow is changed, accumulations of hardened fine powder are often present. In the powder coating industry, this is referred to as impact fusion. The paint powder that is sprayed onto part surfaces also exhibits a chunky appearance rather than giving smooth coverage. This will lead to a bumpy finish after curing of the powder. The combination of the poor fluidization and transportation as well as the irregular finish makes the application of fine paint powders impractical.

Thus, the current technology for application of powder coatings does not provide as high a finish quality as "wet coatings", hindering the further growth of the application of this technology. As mentioned by Bok et al in U.S. Pat. No. 5,171,613, powder coatings are generally characterized as having poor film uniformity, poor distinctness of image and either poor gloss or good gloss with a concomitant heavy orange peel look. Also, excessive film thickness is required to obtain even such limited performance properties. On the other hand, it is difficult to obtain thin films due to the large particle size. Currently, many important coatings, such as color coats and clear coats on car/truck bodies, are still applied by wet coating, due to the quality problems and excessive thickness associated with powder coatings.

The lower quality surface finish of powder coating ("orange peel" imperfections etc.) and unnecessary excessive thickness, normally 50 microns and upwards, are mainly caused by the larger average particle size than 30–35 microns currently used in the powder coating industry. It is well understood that fine powders with average particle size of less than 20–30 microns can greatly improve the quality of powder coating finishes, making them comparable with wet coating finishes. At the same time, the said fine powders can also make it possible to apply thin film coatings of 10 to 25 microns or even less. Yet the main difficulty causing the application of fine powders to be impractical is the inability to smoothly fluidize and pneumatically transport them. Since such fine powders normally fall into Group C of the Geldart's classification, they tend to agglomerate badly, making their handling extremely difficult, if not impossible. Therefore, solutions to these problems will break the barrier to the applications of fine paint powder and open up a very promising market for the powder coating industry.

U.S. Pat. No. 5,635,548 teaches that the flowability of fine paint powders may be increased by dry-blending at least two different additives from the following list of inorganic additives: alumina, aluminum hydroxide, calcium oxide, silica, zinc oxide, zirconia, molybdenum trioxide, ceric oxide, tungsten trioxide and aluminum silicate. The most effective additives, according to the inventors, are alumina, aluminum hydroxide, aluminum silicate and silica. The additives have been identified empirically by experimentation without a theoretical framework. Most of the above additives are ceramic or mineral in nature.

U.S. Pat. No. 5,470,893 discloses powder coating compositions with different additives provided to serve various purposes, for example a granulating agent or an additive which adds a metallic luster appearance to the resulting coating.

In order to resolve these problems that are encountered in the powder coating industry as well as in other industries, a method of improving the flowability or flow characteristics of fine powders is needed to facilitate large scale usage of the fine powders in such areas as coatings and the like. Thus it would be very advantageous to provide a method of increasing the flowability or transportability of ultrafine powders using more effective and a much broader selection of measures than is currently available.

SUMMARY OF THE INVENTION

The present invention is based on a mechanism, recently discovered by the inventors, for how an additive of a powder comprising particles of smaller size than the average size of the fine powder can increase flowability of the fine powder. Specifically, the inventors have discovered that increased flowability is observed when an additive in powder form, which is to be added to the powder whose flowability is to be increased, has both a smaller size than the fine powder and to a mean apparent particle density less than the mean apparent particle density of the fine powder. The particles of the additive act to separate the fine powder particles and reduce the van der Waals and other possible interparticle forces allowing the flowability of the fine powder to be increased. In addition, the particles of the additive also tend to cling to the surface of the fine powder particles and may serve as "rolling wheels" when the fine powder is being handled.

In one aspect the present invention provides a method of increasing flowability of a powder, comprising:

dry blending said powder with an effective amount of a fluidization additive to produce a dry blended mixture, said powder comprising first particles having a first volume-mean equivalent particle size and a first mean apparent particle density, said fluidization additive comprising a second powder with particles of said second powder having a selected second volume-mean equivalent particle size less than said first volume-mean equivalent particle size and having a selected second mean apparent particle density less than said first mean apparent particle density.

In another aspect of the invention there is provided a powder composition, comprising:

a first powder comprising particles having a first volume-mean equivalent particle size and a first mean apparent particle density; and a second powder comprising second particles having a selected second volume-mean equivalent particle size less than said first volume-mean equivalent particle size and having a selected second mean apparent particle density less than said first mean apparent particle density.

In another aspect of the invention there is provided an article coated with a paint coating derived from a powder composition, the powder composition comprising:

a paint powder comprising first particles having a first volume-mean equivalent particle size and a first mean apparent particle density; and a second powder comprising second particles having a selected second volume-mean equivalent particle size less than said first volume-mean equivalent particle size and having a selected second mean apparent particle density less than said first mean apparent particle density.

BRIEF DESCRIPTION OF THE DRAWINGS

Further features, object and advantages will be evident from the following detailed description of the present invention taken in conjunction with the accompanying drawings, in which.

DETAILED DESCRIPTION OF THE INVENTION

The present invention provides means of using solid powder additives to improve and enhance the flowability, fluidizability or transportability of powders, and in particular fine Geldart Group C powders. The invention disclosed herein provides a much larger selection of solid powder additives that can be used than has heretofore been appreciated as potential additives, to assist the powder flowability. This invention also provides general guidelines on how to find and/or make the most effective additives, based on the theory discovered in the associated study. More particularly, the present invention provides effective solid additives to assist the flow of fine paint powders (<20–30 microns) so as to allow the use of fine paint powders in powder coating process, to produce surface coatings of much higher finishing and/or very thin coatings, which cannot be achieved with paint powders of coarser size (>30–35 microns). In another particular case, this invention provides an effective technique to enhance the fluidization of ultrafine pharmaceutical powders (in the range of 0.1–10 microns) for pulmonary drug delivery, so as to increase the accuracy and efficiency of drug dispensing and delivery. In yet another particular case, the present invention also provides a method of enhancing the handle-ability of Group C fine powders for the selective laser sintering process, to obtain products of smoother surface and stronger structure.

It should be noticed that Group C powders are sometimes also referred to as ultrafine powders. On the other hand, Group A powders are often referred to as fine powders. Occasionally, Group B or Group D powders are also referred to as fine powders. In the following description, the term "fine powder(s)" and "fine particle(s)" primarily refer to Geldart Group C powders/particles. However, it will be appreciated by those skilled in the art that this invention may also be applied to Group A, Group B and Group D powders as well.

Definitions

Particles have many different physical properties, including particle size (diameter), density and shape. There are also many definitions of these physical properties. For example, for non-spherical particles, there is the volume-equivalent particle diameter, the surface area-equivalent particle diameter and the specific surface-equivalent particle diameter. A powder contains many particles, often of different sizes. In this case, there are also different definitions of the average (mean) particle sizes (diameters), including volume-mean equivalent particle size, surface area-mean equivalent particle size, and specific surface-mean (also called Sauter mean) equivalent particle size.

Figure 2A:
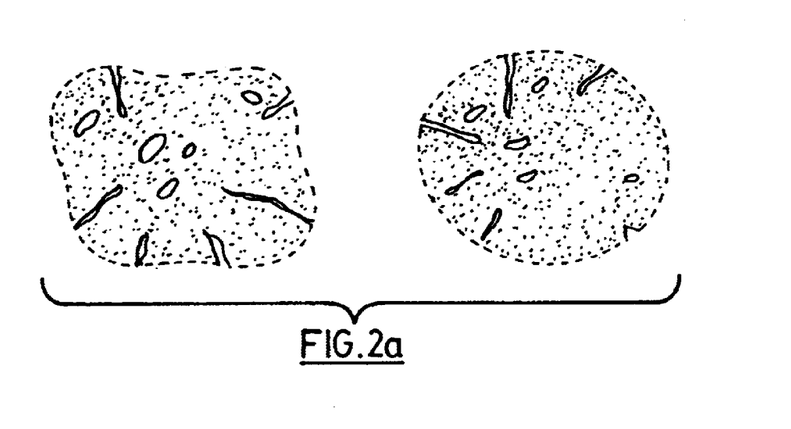
FIG. 2 schematically illustrates the definition of the apparent particle volume for particles having a porous, branched and frame structure.
Figure 2B:
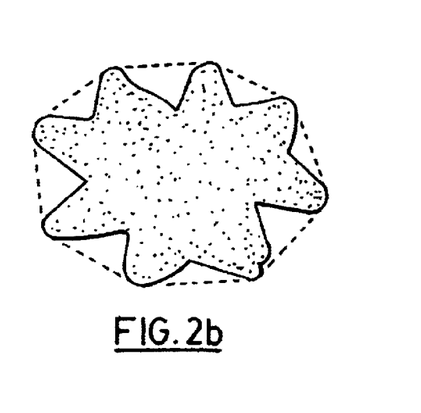
Figure 2C:
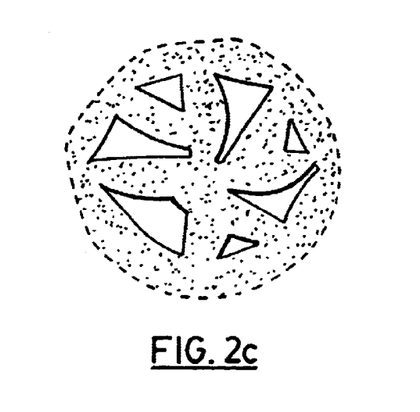

In this specification, the particular diameter chosen to describe the diameter of a particle is the volume-equivalent particle diameter, defined as the diameter of a spherical particle that has the same volume of the particular particle that is referred to. As shown by the dashed line in FIG. 2a, the volume of the particle is defined as the volume that is contained within the outskirt of the particular particle, including the volume of pores that are within the outskirt of the particle boundary. The outskirt is shown with the dotted lines in FIGS. 2a, 2b and 2c. For a highly branched or framed particle, the volume of the particle also includes the space enclosed by connecting the outer tips of the branches or frames through the shortest distances, as shown by FIGS. 2b and 2c, such a volume being called the apparent volume. Therefore, if the particle volume is V, the volume equivalent particle diameter, $d_p$, can be calculated by $d_p=(6V/\pi)^{1/3}$.

In the case of a group of particles, we choose to use the volume-mean equivalent particle size to represent their mean particle size. The volume-mean equivalent average particle size is defined as the diameter of a spherical particle that has the average volume of all the particles involved, which can be obtained by dividing the sum of the volumes of all particles involved by the total number of particles involved. That is, if there are n particles each having a volume-equivalent particle diameter, $d_{pi}$, respectively, the volume-mean equivalent average particle size, $\bar{d}_p$, can be calculated by $$\bar{d}_p = \sqrt[3]{\sum_{i=1}^{n} d_{pi}^3 / n}$$

Many commercially available particle size measurement instruments, such as the Malvern Master Sizer, provide a direct output of the volume-mean equivalent average particle size for a sample of particles being measured. In this disclosure, the mean or average particle size or diameter is the mean volume-equivalent size or volume-mean equivalent size, defined as the diameter of a spherical particle that has the average volume of all the particles involved, with the volume of each particle defined as the volume that is contained within the outskirt of the particular particle, including the volume of pores and all voids that are within the outskirt of the particle boundary.

Particle density also has several definitions, such as bulk density, true (or skeleton) density, and apparent (or pseudo) density. The true (skeleton) particle density is defined as the density of the material that the particles are made of. The bulk particle density is defined as the density of the packed particle bulk that includes the volume of the particles and the voids between the particles within the boundary of the particle bulk. The apparent (or pseudo) particle density is defined as the average density of the materials and includes the volume of any pores within the individual particles or empty space within the particle boundary. In this disclosure, in particular, the apparent particle density of a particle is defined as the ratio of the total particle weight to the total apparent volume that outskirts the entire particle, including all internal and surface pores and cavities, as shown by FIG. 2a. In the case of a highly branched or framed particle, the apparent volume also includes the space enclosed by connecting the outer tips of the branches or frames through the shortest distances, as shown by FIGS. 2b and 2c. That is, the apparent volume includes all the empty space enclosed by the branches and frames are considered part of the particle volume. In the case of a group of particles, the mean apparent density is defined as the average of the apparent densities of all particles involved.

The present invention is based on the inventors' recent discovery of the mechanism regarding how and why the addition of some extremely fine particles improves the fluidization and thus provide general guidelines on how to identify or produce additives that can enhance fluidization for many different types of powders including organic based and inorganic based powders. Not wishing to have the present invention limited or bound by any particular theory or hypothesis, J. Visser (Powder Technology., Vol 58, 1989, pages 1–10) suggested the following equations to estimate the mutual attraction force $F_{SS}$, van der Waals force, between two identical spheres of radius R:

$$F_{SS} = \frac{AR}{12H^2}$$

where A is the Hamaker coefficient determined by the material property; H is the separation distance which is equal to or larger than the minimum distance (in an order of nanometers for spherical particles of sizes in an order of microns) determined by the surface roughness. By way of non-limiting example, assuming two identical particles of 10 microns in diameter are in intimate contact with a separation distance of $H_1$=100 nm, placing a smaller additive particle of 2 microns in diameter between the two 10 micron particles will reduce the interaction force therebetween by a factor of N, if the additional van der Waals force between the smaller additive particle and the two 10 micron particles is not considered:

$$N = \frac{F_{ss2}}{F_{ss1}} = \left(\frac{H_1}{H_2}\right)^2 = \left(\frac{100}{2000}\right)^2 = \frac{1}{400}$$

Therefore, when the additive particle is porous or hollow or of less density, which renders it light weight, the particle-particle interaction force may be significantly reduced due to the fact that the additional interaction forces between the additive particle and the two original particles are not large enough to maintain the interaction force as high. On the contrary, if the apparent density of the additive particle is similar to or even higher than that of the two original particles, the additional interaction forces between the additive particle and the two original particles will be high, leading to a less significant reduction of the overall particle-particle interaction forces. It will be understood that the above analysis is only intended to illustrate in part the discovery by the inventors on which the present invention is based and in no way is to be interpreted as a limitation on the additive particle sizes or the sizes of the particles to which the additives are to be added which fall within the scope of the present invention.

Thus, an effective approach to increase flow characteristics of fine powders is dry-blending one or more finer additives (fluidization aids or "lubricating agents") with the fine powders to reduce the van der Waals and other interparticle forces between particles. The mean size of the additive powders are significantly smaller, at least half of the size but preferably much smaller, than those of the fine powders to which the additives are being added to. The intimately dry-blended particles of the additive(s) with the fine powder increase the particle-particle distances among the fine powder particles so that the interparticle forces can be significantly reduced. Another function of the finer additives is that the relatively smaller particles of the additives work as "rollers" in between the fine powder particles so as to reduce the particle-particle friction.

Other mechanisms such as breakage of interparticle water-bridges, surface charge dissipation or bond saturation by the additives may also contribute to the reduction of interparticle forces. Even a small fraction of additive(s) may largely improve the flowability of fine powders. Studies by the inventors have shown that the particles of the additive(s) should also have a lower apparent particle density or apparent specific gravity (defined as the ratio of the apparent particle density to the density of water), by at least 10% less, and preferably much less, than that of the fine powder particles. Thus, porous or branch shaped particles of the additives have been shown to work well which is consistent with their apparent specific gravities or apparent particle density being much lower as compared to the fine powder particles.

In the broadest aspect, this invention is useful for fluidizing powders having mean apparent particle densities in a range from about 100 kg/m$^3$ to about 13,000 kg/m$^3$ and having volume-mean equivalent particle sizes in a range from about 0.1 micrometers to about 10 millimeters using additive powders dry blended therewith having mean apparent particle densities is in a range from about 10 kg/m$^3$ to about 8,000 kg/m$^3$, but always less than that of the powder to be fluidized, and having volume-mean equivalent particle sizes in a range from about 0.005 micrometers to about 1,000 micrometers, also always less than that of the powder to be fluidized.

In the case of fine paint powders, normally when an additive powder compound is used alone, the weight percent of the additive in the mixture should preferably be at least 0.1% to ensure the "lubricating" effect and should be lower than 5% to avoid defects on the paint finishes. The mean apparent particle density of the fine paint powders is preferably in a range from about 1000 kg/m$^3$ to about 7,000 kg/m$^3$, and the mean apparent particle density of the additive powder particles is preferably in a range from about 100 kg/m$^3$ to about 2,000 kg/m$^3$, but always less than that of the powder to be fluidized. Similarly, the volume-mean equivalent particle size of the paint powder particles is preferably in a range from about 0.5 micrometers to about 1.0 millimeters, and the volume-mean equivalent particle size of the additive powder particles is preferably in a range from about 0.01 micrometers to about 100 micrometers, also always less than that of the powder to be fluidized.

The present invention may cover additives of both inorganic and organic origin.

Inorganic Additives

Many inorganic compounds can be readily produced with a porous or branched structure thus exhibiting the preferred low apparent density property mentioned above. During the process, the candidate additives were ground down to sizes significantly smaller than the fine powder to which the additives were to be added, and then thoroughly dry-blended with the fine powder. Examples of some of the commercially available inorganic materials, which the inventors have discovered may be used as fluidization additives in accordance with the present invention, and some of their effects produced when used as additives to powder coatings, are listed in the Table 1 of Example 1.

Exemplary inorganic compounds shown to work well include: zeolite, perlite, vermiculite, mica, fumed titanium dioxide, graphite black, carbon black, magnesium oxide and boron nitride. All these compounds work well as fluidization aids ("lubricants") for fine powders. Each of these compounds may be utilized alone or in combination with others. The optimum weight percent of the additive in the mixture varies widely, for example, from 0.1% to 20% by weight, depending upon the type of fine powder to be processed or "lubricated" and which of the compounds are to be dry-blended with the powder.

For purposes of comparison, the previously known additives, fumed silica and fumed alumina, the last two entries in the table of Example 1, are also included. These two additives were prepared and dry-blended with paint powder following the same procedure as the new additives in the Table 1. It is seen from Example 1 that all the inorganic additives improved, to different extents, fluidization, pneumatic transportation and handle-ability when ground down to sizes significantly smaller than the fine powder and thoroughly dry-blended with the fine powders. Such improvements can be shown by easier onset of fluidization, reduction or elimination of channelling, higher bed expansion etc., when fluidized. Such improvements can also be demonstrated by a smaller angle of repose, increased throughflow rate during particle screening etc. Furthermore, the enhancements to fluidization quality and powder handlability can also be seen from the significantly improved surface coating quality.

Surface quality enhancements with the additives dry blended with the fine paint powder were also distinct, but to different extents. For fine paint powders, the inorganic additives are good for almost all color coats and most clear coats while their costs are normally low. It will be understood that caution must be exercised when selecting fluidization additives for mixing with paint powders that are used for clear coats. For example, titanium dioxide and zeolites impart a white opacity. Therefore, if these materials are to be used as additives in clear coats the weight percent of the material in the paint powder formulation must be limited. Graphite black or carbon black is most suitable for dark colored paint powder.

EXAMPLE 1

TABLE 1

Examples of Inorganic Solid Additives Tested

| Additive | Ability in Improving Fluidization | Ability in Improving Screening throughput | Ability in Avoiding Accumulation in Hose and Gun | Coating Surface Quality | Added Cost | Volume-Mean Equivalent Particle Size (microns) | Mean Apparent Particle Density (kg/m$^3$) |
|---|---|---|---|---|---|---|---|
| Zeolite | Excellent | good | excellent | high | very low | 1–4 | 500–800 |
| Perlite | Excellent | good | excellent | very high | very low | 0.5–5 | 500–800 |
| Vermiculite | Excellent | good | excellent | very high | very low | 0.5–6 | 500–800 |
| Mica | Good | good | good | high | very low | 0.5–5 | 500–800 |
| Fumed titanium dioxide | Excellent | excellent | excellent | very high | high | 0.01–0.05 | ≈200–400 |
| Graphite black or carbon black | Excellent | excellent | excellent | high | low | 0.1–2 | ≈200–400 |
| Boron nitride | Fair | good | good | fair | very high | 0.5–4 | 500–800 |
| Magnesium oxide | Good | good | good | high | low | 0.5–5 | 500–800 |

TABLE 1-continued

Examples of Inorganic Solid Additives Tested

| Additive | Ability in Improving Fluidization | Ability in Improving Screening throughput | Ability in Avoiding Accumulation in Hose and Gun | Coating Surface Quality | Added Cost | Volume-Mean Equivalent Particle Size (microns) | Mean Apparent Particle Density (kg/m$^3$) |
|---|---|---|---|---|---|---|---|
| Fumed alumina | Excellent | good | excellent | very high | very high | 0.01–0.1 | ≈100–300 |
| Fumed silica | Excellent | good | excellent | low (causing bits) | very high | 0.01–0.1 | ≈100–300 |

Design of New Additives

It will be understood by those skilled in the art, that based on the understanding of the criteria the additive powders must exhibit in order to impart improved flow characteristics to powders, one can also search for other additives than the commercially available inorganic compounds listed above. Many organic materials, for example, can also be used for this purpose, since they tend to be lighter. Furthermore, it is now also possible to design and make suitable additives for specific applications based on a knowledge of the size and the densities of the powder to have its flowability increased. For example, a small fraction of a powder that is to be fluidized (or a small fraction of one or more constituent component powders of a mixture of powders that is to be fluidized) may be processed to make them smaller (by grinding, for example) and lighter (by expansion, for example, or other physical processes). This processed fraction, dry-blended back into the original powder, then becomes the additive to the initial powder or mixture of powders, to aid the fluidization, handling and transportation.

An added benefit of such an approach is that no foreign material is added into the powder(s), which may be very important in some cases, for example where the paint or other powder may be reactive and thus prone to reaction with known additives and/or where foreign contamination must be avoided. This is especially useful for the processing of drug powders where contamination must be strictly controlled. In the latter case, one can take out a small fraction of the drug powder (or one of the constituent powder in the case of a powder mixture) and process them into finer and lighter additives and then dry-blend them back into the drug powder to enhance its flowability.

For paint powder, for example, carbon black is a pigment that is used in most black, and many other dark paint powders. A small fraction of the carbon black may be removed before the extrusion process, where the pigments are fully dispersed with the resins, fillers and other necessary paint components. This small fraction of carbon black is then processed (using jet-mill, for example) to make them small enough in size relative to the bulk carbon black powder size to make it suitable as a fluidization additive. Since the apparent particle density of commercial carbon black pigment is already much lower than that of the paint powder, the processed fraction of carbon black now becomes an effective fluidization additive which is dry-blended into the paint powder after the paint powder has been ground and screened after the extrusion.

Similar processing may be carried out with titanium oxide, which is a typical pigment for white and light colour paint powders. A small fraction of the titanium oxide pigment is removed and processed into fumed titanium oxide particles of appropriate size, and then dry-blended back into the finished fine paint powder. In this case, the titanium oxide is processed to make the titanium oxide particles smaller and to make them lighter through fuming since the initial apparent density of the titanium oxide particles may be quite high. In this case, the pigment material serves as the additive as well as the pigment. For example, instead of fuming the small fraction of the titanium oxide, one may purchase fumed titanium oxide of suitable size as flow additives while reducing the amount of titanium oxide initially put into the paint as pigment. Studies by the inventors have shown that using carbon black and titanium oxide as the additive as well as the pigment component, provided significant enhancement to the powder fluidization/transportation and in addition obtained excellent results with the final coating surface. Besides pigment, various powder paint fillers can also be processed into flow additives. This is especially true for those fillers which have a lower apparent particle density than the finished powder paint product, since they can be processed by simply grinding down their sizes. For example, Mica is sometimes used as a paint filler, but is also a good fluidization additive when ground down to smaller sizes. Other fillers which have higher apparent particle density would need to be expanded or go through other processes such as re-formation or re-shaping (branching etc.) to reduce their densities. For the same reason, some additives may also be adopted as paint fillers. For example, the inventors have found that certain types of zeolite (of low apparent density) can be used as fluidization additives. These were tested and found to also function well as suitable powder paint fillers. For example, commercially available zeolite studied herein has been used as a paint filler and upon suitable processing to reduce its size and apparent particle density the processed zeolite has also been used as a fluidization additive, producing coatings of excellent quality.

Other inorganic additives contemplated by the inventors to be useful as fluidization additives include metal and non-metal oxides such as boron oxide, calcium oxide, scandium oxide, titanium dioxide, vanadium oxide, chromium oxide, magnesium oxide, iron oxide, cobalt oxide, nickel oxide, cooper oxide and barium oxide. Other inorganic compounds may be selected from the chlorides such as sodium chloride, titanium chloride; from the sulphides such as iron sulphide, zinc sulphide, cadmium sulphide; chromates such as sodium chromate, barium chromate, cooper chromate; titanates such as barium titanate, lead titanate; and silicates such as borosilicate, magnesium silicate, zinc silicate. Other inorganic additives may also be selected from the carbides such as silicon carbide, molybdenum carbide and tungsten carbide; boronides such as molybdenum boronide and tungsten boronide; and nitrides such as titanium nitride, zircon nitride and silicon nitride. Metal hydroxides may also be used such as for example calcium hydroxide, magnesium hydroxide, zinc hydroxide, nickel hydroxide, iron hydroxide and copper hydroxide.

Other inorganic compounds that may be used include sulphates including but not limited to barium sulphate, magnesium sulphate and zinc sulphate; as well as sulphites including but not limited to sodium sulphite; and phosphates including but not limited to calcium phosphate.

Salts of nitrates such as for example barium nitrate, magnesium nitrate, zinc nitrate; or salts of chlorides such as barium chloride, magnesium chloride, zinc chloride, etc. may be used, as may be carbonates such as calcium carbonate, magnesium carbonate. Sulphides including but not limited to iron sulphide, zinc sulphide and cadmium sulphide, may be used.

Organic Additives

In addition to inorganic materials as fluidization additives, organic-based materials may also be produced in accordance with the present invention. For example, resins, one of the main components of paint powder and organic-based, can also be made into fluidization additives. For example, resin-based fluidization agents has been prepared by mixing a fraction of the resin with an expanding agent and the mixture passed through an extruder. During the high temperature mixing and dispersion process in the extruder, the expanding agent dispersed uniformly in the resin and the expanding agent expanded in size by at least an order of magnitude. As the expanding agent expanded, the resin also expanded to form a much more porous solid bulk of very low apparent particle density. Grinding down the expanded resin resulted in excellent fluidization additives.

Organic materials as additives should be avoided that have physical and/or chemical properties that lead to clumping or sticking, rather than the desired result of "lubricating" the paint and other particles. For example, preferred organic materials as additives should be hard enough and have a high enough glass transition temperature over the processing range of the dry blended powder composition to avoid the additive becoming too soft, tacky or sticky which would lead to clumping of the paint powders.

For all the above situations and examples, it is extremely beneficial for the powder paint, and for all powders and powder mixtures, that no foreign materials are added. This benefit comes from the discovery that effective fluidization additives need to have lower apparent particle density than the bulk powder. Such understanding has not been achieved before.

Combinations of two or more of the above mentioned additives have also been prepared and it has been observed that normally more favorable property enhancements can be obtained compared to using them alone. Combination of the additives and the fraction of each additive in the combination can be changed according to the applications. However, the overall percentage of the additives for fine paint powders are preferably limited to under 5% by weight to avoid defects.

Preferred polymer-based powder paint includes thermoplastic and thermosettable paint powders. Non-limiting examples of the thermosetting polymer materials include polyesters, polyurethanes, epoxy, acrylic and combinations thereof. Non-limiting examples of thermoplastic polymer materials includes polyamides, polyolefins, vinyls and poly (vinylidene fluoride) and combinations thereof.

Fine paint powders are those powders with average sizes of 20–30 microns or smaller, while the regular paint powders have average sizes of 30–35 microns or larger, both being the volume-equivalent diameter. An example of a fine paint powder formulation is given below in the table in Example 2 below, with the first six rows giving typical paint powder constituents and the last four rows giving the fluidization additives dry-blended into the fine paint powder.

EXAMPLE 2

TABLE 2

An example of a fine paint powder formulation, with and without additives

| Constituent component | Percentage (%) | Volume-Mean Average Particle Size (microns) | Apparent Particle Density (kg/m$^3$) |
|---|---|---|---|
| Polyester Resins | 65.78 | | |
| Pigments | 25.4 | | |
| Fillers | 11.58 | | |
| Flow Agent | 1.08 | | |
| Degassing Agent | 0.56 | | |
| Waxes | 0.60 | | |
| Fumed Titanium Oxide | 0.25 | 0.02 | ≈300 |
| Mica (already expanded when purchased) | 0.15 | 3.5 | ≈450 |
| Perlite (already expanded when purchased) | 0.35 | 4.0 | ≈400 |
| Vermiculite (already expanded when purchased) | 0.25 | 5.5 | ≈350 |

The above formulation was made by first dry-blending the first six constituents in the Example and passing the mixture through an extruder, where the different constituents were well dispersed and formed a large solid sheet. This solid sheet was then broken and milled down to an average volume-mean particle size of 35 microns, with an average apparent particle density of 1,530 kg/m$^3$. Then, a portion of the paint powder was kept as a control sample for the regular-sized paint powder for comparison purpose, while the other portion was further jet-milled down to two batches of average volume-mean particle sizes of 13 and 17 microns, forming the fine paint powders, which have an average apparent particle density of around 1,530 kg/m$^3$. At this time, part of each batch of the fine paint powders was again kept aside as control samples for the two size fine paint powders. At the same time, commercially available Mica, Perlite, Vermiculite were individually jet-milled to an average volume-mean particle size of 1–5 microns, to be used as additives. Fumed titanium oxide commercially available is already fine enough so that there is no need to grind it down. These four additives were then dry-blended together first and then thoroughly dry-blended into the remaining portions of the two fine paint powders, producing two modified fine paint powders, suitable for application using typical powder coating apparatus.

All five samples, the two modified fine paint powders (of 17 and 13 average particle sizes, #4 and #5 in Table 3), the two kept aside fine paint powders without additives (also of 17 and 13 average particle sizes, #2 and #3 in Table 3) and the kept aside regular paint powder (of 35 average particle size, #1 in Table 3), were then tested and compared for their flowability and fluidization qualities. Essentially, there is basically one paint powder formulation ground into three average size groups, 35, 17 and 13 microns (numbers 1–3 in Table 3). Part of the two smaller groups, 17 and 13 microns, were also further modified by adding the combination of the four additives listed in the table in Example 2, to form another two groups of (the modified) fine paint powders (numbers 4 and 5 in Table 3).

As shown in Table 3 below, paint powders of the same size but with additives (#4 and #5) have much smaller angles of repose and much higher bed expansion, both indicating significantly improved fluidization and transportation behaviour. When compared to the regular-sized paint powder (#1, 35 microns), the two modified fine paint powders showed lower angles of repose and higher bed expansion, showing that the flowability of the two modified fine paint powders is no less, or even better than that of the regular-sized paint powder.

TABLE 3

Comparison of selected flow behaviour between fine powder with and without additives and regular-sized paint powder

| | Volume-Mean Powder Size | Additives | Angle of Repose | Bed Expansion Ratio |
|---|---|---|---|---|
| 1 | 35 microns | No | 33 degree | 40% |
| 2 | 17 microns | No | 41 degree | <~10% |
| 3 | 13 microns | No | 49 degree | Hardly any |
| 4 | 17 microns | Yes | 27 degree | 130% |
| 5 | 13 microns | Yes | 31 degree | 120% |

All those five paint powders were used to coat sample panels. The two fine paint powders without additives (#2 and #3) could not be transported continuously through the transportation line and can hardly be fluidized in the feeder, resulting in significantly worse coating surface than that of the regular-sized 35 micron powder (#1). On the other hand, the two fine paint powders with additives (#4 and #5) flowed nicely and obtained much better coating quality than that of the regular-sized 35 micron powder (#1).

Figure 3:
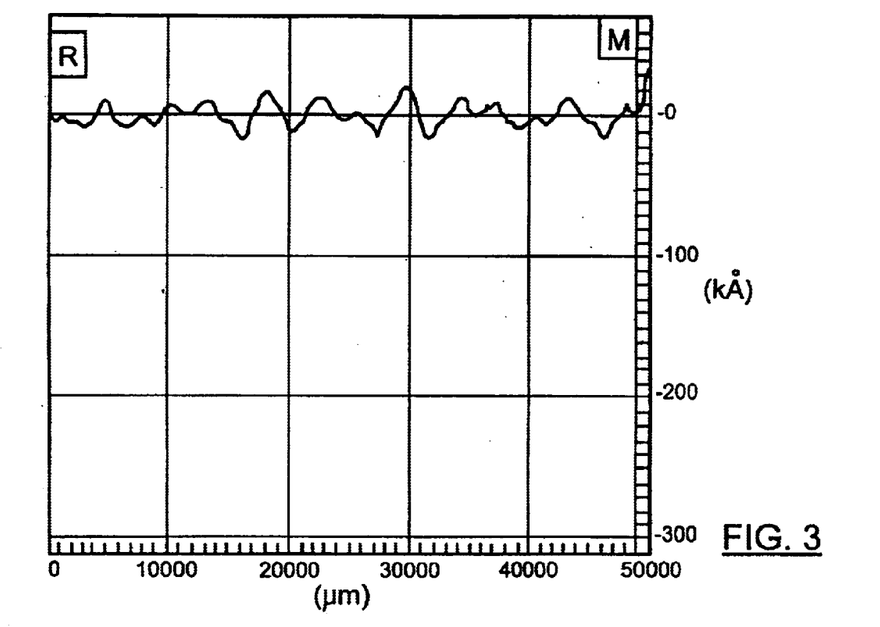
FIG. 3 is a surface profile on a sample panel coated using a regular size polyester powder (35 microns) with a composition given in Example 2 but without any of the fluidization additives, produced by a Dektak3ST stylus surface profiler, with 50 mm scan length.
Figure 4:
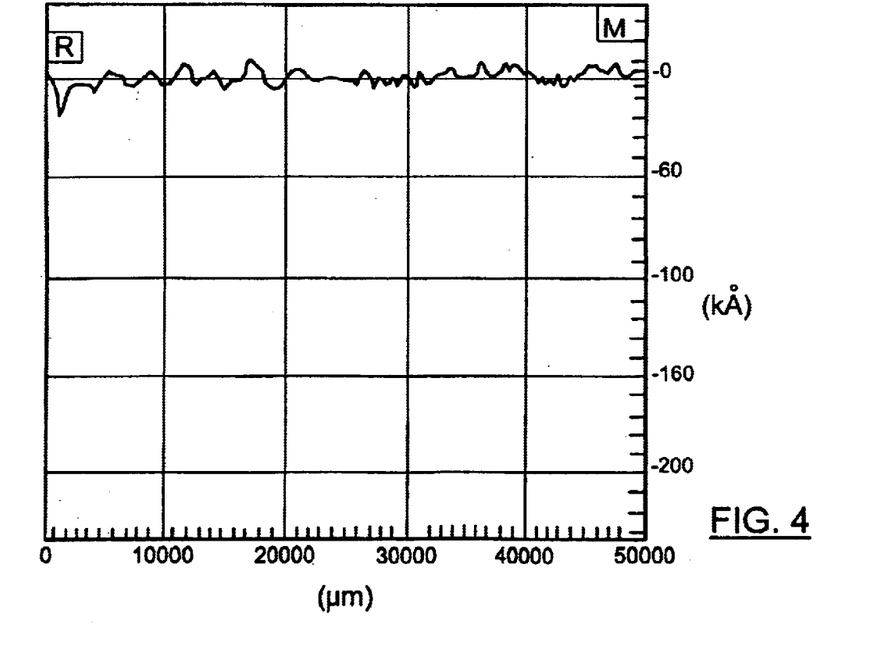
FIG. 4 is a surface profile of a sample panel coated with the same powder coating as that in FIG. 3 but with a much finer powder size (13 microns) with additives added, its composition also detailed in Example 2.

FIGS. 3 and 4 show the analysis results of a surface profiler, giving the coating surface profiles of the modified fine paint powder (#5, with mean size of 13 microns) with fluidization additives and the regular sized paint powder (the control, #1), coated onto standard sheet metal panels (0.8 mm×76 mm×127 mm Steel dull finish panels). FIG. 3 shows the surface profile of the substrate coated using the regular size powder (#1, 35 microns). FIG. 4 is from the sample panel coated with the modified fine paint powder of the much finer powder size (#5, 13 microns), with additives in the powder. Both profiles are produced by a Dektak3ST stylus surface profiler, with 50 mm scan length. The average roughness is significantly reduced from 20,500 Å in regular size powder to 6,691 Å in the modified fine powder.

Therefore, it can be concluded that with the use of the additives disclosed herein, fine paint powders can be fluidized, transported and sprayed, and a greatly enhanced surface appearance can be achieved after curing. The absence or significant reduction both in number and in magnitude of orange peels and very flat surface ensures a high distinctness of image. The reduction of orange peels or roughness can be confirmed by measuring the surface profile and comparing to that of a regular size powder coating.

In addition, with the use of fine paint powders with the additives present, a very thin coating surface in the order of 20 microns or less can also be achieved after curing. This is typically very hard to achieve with the regular-sized paint powders, given their larger particle sizes. Thin film coatings are very beneficial for those surfaces that do not need a significant thickness for protection, since it represents significant savings. Furthermore, thin film coating is also extremely useful for parts that include holes and pins with small tolerances, threads or other details. Typically these small parts must be masked when coating with regular-sized powder paint in order not to loose the details or to cause significant changes of clearances (otherwise, for example, screws can not fit into the thread covered with thick paint). When fine powder paint is used to produce a thin film, most of the masking becomes unnecessary.

It will be noted that seeds and bits are protrusions located in the film arising from small solid components of the powder formulation or foreign contaminants that do not melt during the curing process. This is particularly problematic when inorganic constituents are present in organic based powder paint formulations. For thinner films, removal of the larger sized solids is important due to the inability of the paint films to hide any seeds and bits that are above the desired film thickness. Therefore, to obtain a seed-bit-free film of 20 period of one or more of said sub-gratings. d solid additives should be significantly smaller than 20 microns in particle size.

Although the invention has been illustrated using fine paint powders as an example, it will be clear to those skilled in the art that similar improvements on fluidization, transportation and handlability of fine powders can be achieved with fine powders used in other applications. The present invention may be applied to any application involving powder production, treatment and dispensing etc. in which fine powders are to be fluidized and handled for different applications where agglomeration, chunking and clumping of powders are undesirable. For example, the additives, or lubricating agents, disclosed herein ensure that non-fluidizable and non-pneumatically transportable fine powders can be fluidized and pneumatically transported. In addition to this, the additives also prevent the fine powders from forming clumps and agglomerates, and thus ensure uniform delivery of fine powder from one station place to another. In the process of fine powder production, fine powders may be readily screened with the use of one additive or combinations of several fluidization additives. Therefore, for many industries where fine powder production and/or handling are involved, application of this invention can ensure smooth fluidization and pneumatic transportation as well as enhanced screening efficiency.

Other than the powder coating industry, this invention can also be applied to, for example, the pharmaceutical industry. One example of its use in the pharmaceutical industry is to enhance the fluidization and dispersitivity of the extremely fine (in the range of 0.1–10 microns) drug particles encountered in the pulmonary drug delivery process. Due to the extremely small particle size, those drug powder agglomerate badly and can hardly fluidize. With the addition of suitable fluidization additives (of even smaller size and lower apparent density), those small drug powder can be fluidized and therefore handled pneumatically.

Another application is in the selective laser sintering process, used for rapid prototyping where different structures are built in a layered sintering approach under laser beam with powder as the building materials. In this process, the use of finer powder(s) is expected to enhance the surface quality and the strength of the finished part, but the current selective laser sintering technology cannot use fine Group powders due to the poor flowability. This invention gives an effective mean to enhance the handlability of Group C fine powders in the selective laser sintering process, making the use of finer powders feasible. In this case, we can add some finer particles as additives. Those finer particles can be the same material as the building powder or one of the building powders or can be a different material which does not affect the sintering process.

There are numerous applications for the present invention in which it is desirable to make fine powders much easier to handle. For instance, in many industries involving powders, the powders are often screened during the production processes in order to remove the particles that are outside of the desired size ranges. With fumed titanium dioxide as a "lubricant", for example, the fine powders pass through the sieves much more quickly than any other agents tested. Thus, for processes where powder screening is involved, fumed titanium dioxide would be a preferred additive. Another example is that many of the fluidization materials disclosed herein, such as zeolite, perlite and fumed titanium dioxide provide excellent improvement in avoiding accumulations in powder transportation such as hoses and guns. Therefore, for processes where pneumatic transportations of fine powders are involved, these additives are preferred.

It should be pointed out that while the present invention has been described with emphasis on enhancing the flowability of fine powders, it will be appreciated by those skilled in the art that additives may also be applied to larger (Groups A, B and D) powders with mean particle sizes larger than 30–35 microns to enhance their handle-ability. Some coarse powders exhibit poor fluidization and transportation properties especially in a moist environment (e.g., high humidity). The addition of additives disclosed herein will advantageously increase flowability of these larger sized powders.

The present invention also provide a much broader choice of materials that can be used as fluidization aids ("lubricating agents") for fine powders than heretofore realized so that there are now many choices of additives available for different applications of fine powders. With the understanding of the underlying theory, one can also seek or even make specific additives. This is very advantageous since certain agent(s) may be problematic if mixed with certain powders due to various side effects that may result (e.g., undesired chemical reactions, contamination, unwanted coloring effects and other physical changes of powder properties etc.). Furthermore, different additives have different influences on certain aspects of powder properties. For example, some additives largely improve fluidization quality but affect the powder transportation property and screening efficiency to a lesser extent, and vise versa. A particular advantage of the present invention is that since many types of materials can be processed to provide porous, branched or other frame-like structures so that for many powders, the fluidization additive may be the powder itself, or one or more of the components comprised in the powder mixture, rather than another additive.

There is disclosed herein for the first time the mechanism for how an effective additive increases flowability of a fine powder. Specifically, when a powder form additive, which is significantly smaller and has a lower mean apparent particle density than the powder to which it is being added (lower apparent density can be achieved if the particles are porous or hollow, or in a frame structure) is dry-blended in a fine powder system, the particles of the additive will separate the fine powder particles and reduce the van der Waals and other interparticle forces resulting in increased flowability of the fine powder. Furthermore, the particles of the additive will cling to the surface of the fine powder particles and may serve as "rolling wheels" when the fine powder is being handled. However, this effect is less important than the effect on the reduction of van der Waals and other interparticle force. This was verified by the fact that dry-blending additives (much finer than the fine powders) with high particle density to fine powders does not improve flow ability of fine powder. For example, dry-blending regular (non-fumed) titanium oxide ground to 2–3 microns into a fine paint powder did not improve fluidization and transportation, but on the contrary made the fine paint powder more cohesive. Following this reasoning, many additives, not limited to any particular category of particle composition, are contemplated to enhance flowability of powders to which they are blended.

The additives disclosed herein, when used in fine paint powder, have provided high paint film quality in terms of surface smoothness and desired gloss. Most of these additives are also cheaper to produce than the additives disclosed in the prior art mentioned above, as compared in Table 1.

A particular advantage of the present invention is that many types of materials can be processed to provide porous, branched or other frame-like structures, so that for many powders the fluidization additive may be made from the fine powder itself and therefore has the same chemical composition as the powder itself rather than being a foreign additive. For example, one can take some of the fine powder and process it into lighter and finer particles, for example by expansion and grinding, and the expanded material can then be dry-blended with the bulk of the fine powder as the flow additive.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method of increasing flowability of a powder, comprising:
    dry blending said powder with an effective amount of a fluidization additive to produce a dry blended mixture, said powder comprising first particles having a first volume-mean equivalent particle size and a first mean apparent particle density, said fluidization additive comprising a second powder with particles of said second powder having a selected second volume-mean equivalent particle size less than said first volume-mean equivalent particle size and having a selected second mean apparent particle density less than said first mean apparent particle density.

2. The method according to claim 1 wherein said first volume-mean equivalent particle size is at least two times larger than said second volume-mean equivalent particle size, and wherein said second mean apparent particle density is at least 10% less than said first mean apparent particle density.

3. The method according to claim 2 wherein said second powder is present in said powder composition in an amount between about 0.01% by weight and about 20% by weight.

4. The method according to claim 3 wherein said first mean apparent particle density is in a range from about 100 kg/m$^3$ to about 13,000 kg/m$^3$, and wherein said second mean apparent particle density is in a range from about 10 kg/m$^3$ to about 8,000 kg/m$^3$.

5. The method according to claim 3 wherein said first volume-mean equivalent particle size is in a range from about 0.1 micrometers to about 10 millimeters, and wherein said second volume-mean equivalent particle size is in a range from about 0.005 micrometers to about 1,000 micrometers.

6. The method according to claim 2 wherein said particles of said second powder are porous particles, branched particles, or particles with a frame structure.

7. The method according to claim 2 wherein said powder comprises a pure powder or a mixture of powders, and including producing said fluidization additive by processing a selected amount of said pure powder or said mixture of powders thereby producing said second powder with particles having said selected second volume-mean equivalent particle size less than said first volume-mean equivalent particle size and said selected second mean apparent particle density less than said first mean apparent particle density.

8. The method according to claim 7 wherein said step of processing a selected amount includes expanding said selected amount to produce expanded particles with said selected second mean apparent particle density, including grinding said expanded particles to give said selected second volume-mean equivalent particle size.

9. The method according to claim 2 wherein said second powder is present in said powder composition in an amount between about 0.1% by weight and about 10% by weight.

10. The method according to claim 9 wherein said second particles are porous particles, branched particles, or particles with a frame structure.

11. The method according to claim 9 wherein said first mean apparent particle density is in a range from about 1000 $kg/m^3$ to about 7,000 $kg/m^3$, and wherein said second mean apparent particle density is in a range from about 100 $kg/m^3$ to about 2,000 $kg/m^3$.

12. The method according to claim 9 wherein said first volume-mean equivalent particle size is in a range from about 0.5 micrometers to about 1.0 millimeters, and wherein said second volume-mean equivalent particle size is in a range from about 0.01 micrometers to about 100 micrometers.

13. The method according to claim 9 wherein said powder is a paint powder formulation, and wherein said second powder comprises an inorganic compound.

14. The method according to claim 13 wherein inorganic compound is selected from the group consisting of zeolite, perlite, vermiculite, mica, fumed titanium dioxide, graphite black, carbon black, boron nitride and magnesium oxide.

15. The method according to claim 9 wherein said fine powder is a paint powder formulation, and wherein said paint powder formulation comprises a resin constituent, a pigment constituent and a filler constituent, and including producing said fluidization additive from at least one constituent of said paint powder formulation by processing a selected amount of at least one of said resin, pigment and filler constituents to give particles with said selected second volume-mean equivalent particle size less than said first volume-mean equivalent particle size and said selected second mean apparent particle density less than said first mean apparent particle density.

16. The method according to claim 15 wherein said step of processing a selected amount includes expanding said selected amount of at least one of said resin, pigment and filler powder constituents to produce expanded particles with said selected second mean apparent particle density, including grinding said expanded particles to give said selected second volume-mean equivalent particle size.

17. The method according to claim 15 wherein said resin constituents are thermosetting polymer materials selected from the group consisting of polyester, polyurethane, epoxy, acrylic, fluororesin, phenolic-formaldehyde and combinations thereof.

18. The method according to claim 15 wherein said resin constituents are thermoplastic polymer materials selected from the group consisting of olyamides, polyolefins, vinyls and poly(vinylidene fluoride), polyvinyl chloride, polyester, polyetherchloride, ethylene vinyl acetate (EVA), celluloses (acetate, acetate-butyrate), and combinations thereof.

19. The method according to claim 2 wherein said powder is a pharmaceutical formulation comprising an active medicinal constituent, and wherein said second powder comprises a physiologically biocompatible compound.

20. The method according to claim 19 wherein said dry blended mixture of said powder and said fluidization additive are for use in pulmonary drug delivery.

21. The method according to claim 2 wherein said second powder has a chemical composition substantially the same as a chemical composition of said first powder.

22. A powder composition, comprising:
a first powder comprising particles having a first volume-mean equivalent particle size and a first mean apparent particle density; and
a second powder comprising second particles having a selected second volume-mean equivalent particle size less than said first volume-mean equivalent particle size and having a selected second mean apparent particle density less than said first mean apparent particle density.

23. The powder composition according to claim 22 wherein said first volume-mean equivalent particle size is at least two times larger than said second volume-mean equivalent particle size, and wherein said second mean apparent particle density is at least 10% less than said first mean apparent particle density.

24. The powder composition according to claim 23 wherein said second powder is present in said powder composition in a range from about 0.01% to about 20% by weight.

25. The powder composition according to claim 24 wherein said first mean apparent particle density is in a range from about 100 $kg/m^3$ to about 13,000 $kg/m^3$, and wherein said second mean apparent particle density is in a range from about 10 $kg/m^3$ to about 8,000 $kg/m^3$.

26. The powder composition according to claim 24 wherein said a first volume-mean equivalent particle size is in a range from about 0.1 micrometers to about 10 millimeters, and wherein said second volume-mean equivalent particle size is in a range from about 0.005 micrometers to about 1,000 micrometers.

27. The powder composition according to claim 24 wherein said second particles are porous particles, branched particles, or particles with a frame structure.

28. The powder composition according to claim 24 wherein said first powder comprises a pure powder or a mixture of powders, and wherein said second powder comprises a selected amount of said first powder processed to have said selected second volume-mean equivalent particle size and said selected second mean apparent particle density.

29. The powder composition according to claim 23 wherein said second powder is present in said powder composition in an amount between about 0.1% by weight and about 10% by weight.

30. The powder composition according to claim 29 wherein said first mean apparent particle density is in a range from about 1,000 kg/m³ to about 7,000 kg/m³, and wherein said second mean apparent particle density is in a range from about 100 kg/m³ to about 2,000 kg/m³.

31. The powder composition according to claim 29 wherein said first volume-mean equivalent particle size is in a range from about 0.5 micrometers to about 1.0 millimeters, and wherein said second volume-mean equivalent particle size is in a range from about 0.01 micrometers to about 100 micrometers.

32. The powder composition according to claim 29 wherein said powder is a paint powder formulation, and wherein said second powder comprises an inorganic compound.

33. The powder composition according to claim 32 wherein inorganic compound is selected from the group consisting of zeolite, perlite, vermiculite, mica, fumed titanium dioxide, graphite black, carbon black, boron nitride and magnesium oxide.

34. The powder composition according to claim 29 wherein said second particles are porous particles, branched particles, or particles with a frame structure.

35. The powder composition according to claim 29 wherein said fine powder is a paint powder formulation, and wherein said paint powder formulation comprises a resin constituent, a pigment constituent and a filler constituent, and wherein said second powder is selected from at least one of said resin constituent, pigment constituent and filler constituent.

36. The powder composition according to claim 35 wherein said resin constituents are thermosetting polymer materials selected from the group consisting of polyester, polyurethane, epoxy, acrylic, fluororesin, phenolic-formaldehyde and combinations thereof.

37. The powder composition according to claim 35 wherein said resin constituents are thermoplastic polymer materials selected from the group consisting of polyamides, polyolefins, vinyls and poly(vinylidene fluoride), polyvinyl chloride, polyester, polyetherchloride, ethylene vinyl acetate (EVA), celluloses (acetate, acetate-butyrate), and combinations thereof.

38. The powder composition according to claim 23 wherein said second powder has a chemical composition substantially the same as a chemical composition of said first powder.

39. The powder composition according to claim 23 wherein said powder is a pharmaceutical formulation comprising an active medicinal constituent, and wherein said second powder comprises a physiologically biocompatible compound.

40. The powder composition according to claim 39 for use in pulmonary drug delivery.

41. The method according to claim 1 wherein said first volume-mean equivalent particle size is at least three times larger than said second volume-mean equivalent particle size, and wherein said second mean apparent particle density is at least 25% less than said first mean apparent particle density.

42. The powder composition according to claim 22 wherein said first volume-mean equivalent particle size is at least three times larger than said second volume-mean equivalent particle size, and wherein said second mean apparent particle density is at least 25% less than said first mean apparent particle density.

43. The method according to claim 1 wherein inorganic compound is selected from the group consisting of zeolite, perlite, vermiculite, mica, fumed titanium dioxide, graphite black, carbon black, boron nitride and magnesium oxide.

44. The method according to claim 13 wherein inorganic compound is selected from the group consisting of boron oxide, scandium oxide, titanium dioxide, vanadium oxide, chromium oxide, magnesium oxide, iron oxide, cobalt oxide, nickel oxide, copper oxide and barium oxide.

45. The method according to claim 13 wherein inorganic compound is selected from the group consisting of sodium chloride, titanium chloride, iron sulphide, zinc sulphide, cadmium sulphide, sodium chromate, barium chromate, cooper chromate, barium titanate, lead titanate, borosilicate, magnesium silicate, zinc silicate, silicon carbide, molybdenum carbide, tungsten carbide, molybdenum boronide, tungsten boronide, titanium nitride, zirconium nitride and silicon nitride, calcium hydroxide, magnesium hydroxide, zinc hydroxide, nickel hydroxide, iron hydroxide and copper hydroxide.

46. The method according to claim 13 wherein inorganic compound is selected from the group consisting of barium sulphate, magnesium sulphate, zinc sulphate, sodium sulphite, barium chloride, magnesium chloride, zinc chloride, calcium carbonate, magnesium carbonate and calcium phosphate.

47. The method according to claim 13 wherein inorganic compound is selected from the group consisting of barium nitrate, magnesium nitrate, zinc nitrate, barium chloride, magnesium chloride, zinc chloride, calcium carbonate, magnesium carbonate, iron sulphide, zinc sulphide, and cadmium sulphide.

48. The powder composition according to claim 32 wherein inorganic compound is selected from the group consisting of boron oxide, scandium oxide, titanium dioxide, vanadium oxide, chromium oxide, magnesium oxide, iron oxide, cobalt oxide, nickel oxide, copper oxide and barium oxide.

49. The powder composition according to claim 32 wherein inorganic compound is selected from the group consisting of sodium chloride, titanium chloride, iron sulphide, zinc sulphide, cadmium sulphide, sodium chromate, barium chromate, cooper chromate, barium titanate, lead titanate, borosilicate, magnesium silicate, zinc silicate, silicon carbide, molybdenum carbide, tungsten carbide, molybdenum boronide, tungsten boronide, titanium nitride, zirconium nitride and silicon nitride, calcium hydroxide, magnesium hydroxide, zinc hydroxide, nickel hydroxide, iron hydroxide and copper hydroxide.

50. The powder composition according to claim 32 wherein inorganic compound is selected from the group consisting of barium sulphate, magnesium sulphate, zinc sulphate, sodium sulphite, barium chloride, magnesium chloride, zinc chloride, calcium carbonate, magnesium carbonate and calcium phosphate.

51. The powder composition according to claim 32 wherein inorganic compound is selected from the group consisting of barium nitrate, magnesium nitrate, zinc nitrate, barium chloride, magnesium chloride, zinc chloride, calcium carbonate, magnesium carbonate, iron sulphide, zinc sulphide, and cadmium sulphide.

52. The method according to claim 1 wherein said inorganic compound is selected from the group consisting of nitrides, nitrates, suiphides, suiphates, chlorides, carbides, carbonates, phosphides, phosphates, chromates and titanates.

* * * * *